United States Patent Office 2,911,173
Patented Nov. 3, 1959

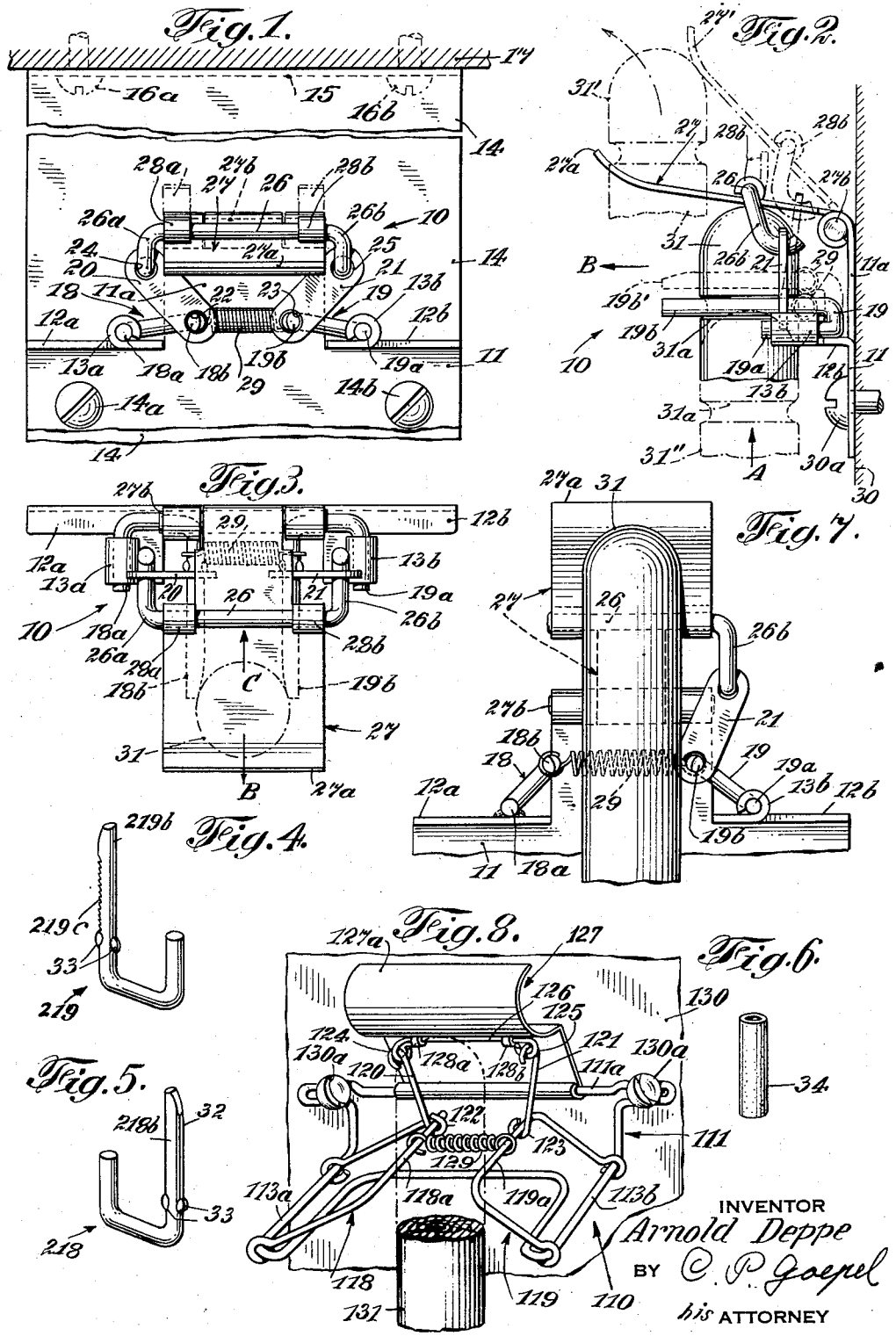

2,911,173

ARTICLE HOLDERS

Arnold Deppe, Bronx, N.Y.

Application July 1, 1957, Serial No. 668,990

8 Claims. (Cl. 248—113)

This invention relates to article holders in general, and more particularly to a device from which round or polygonal handles of certain articles may be suspended.

An object of the invention is to provide a simple but very reliable and efficient device for holding the handle of an article in such manner that the suspended article may be withdrawn when caused to move in a direction opposed and/or transverse to the direction of locking force of the holder.

Another object of the invention is to provide a holding device for certain tools and implements which securely holds the handle of the suspended article but will automatically eject the handle when the latter is caused to move in a direction opposed to direction of locking force of the holder.

A further object of the invention is to provide a holding device for handles of certain tools which includes a novel element in the form of a swinging plate serving as an automatic ejector of the suspended handle when the latter is moved in a direction opposed to the direction of locking force of the holder.

The article holder of this invention broadly belongs into the group of devices operating on the principle that two retaining members, of which at least one may be pivoted, will frictionally retain a handle when connected by a resilient element, but will offer less resistance to removal of the handle when the latter is moved in a direction at an angle with respect to the force of gravity. The main drawback of the known devices operating on such principle is that the force necessary for removal of the handle must be applied in two directions, to wit: (a) in a direction opposed to that of the gravitational force to reduce the friction between the handle and holder, and (b) in a direction transverse to that of the first mentioned force in order to extract the handle from the retaining members after the frictional engagement between the handle and the retaining members has been sufficiently reduced.

My invention overcomes the disadvantages of such known constructions in that a plate, swingably connected with one or both elements which engage and retain the handle is so positioned with respect to the free end of a suspended handle that it will automatically guide the handle away from engagement with the retaining elements upon a relatively short upward movement of the handle, and will at the same time cause the retaining elements to move laterally and thus permit substantially effortless extraction of the handle. The swingable ejector plate acts as an indicator to the user that the suspended article is safely held by the holder when the upper end of the handle abuts against the plate, and automatically ejects the handle if its movement in the direction to pivot the plate is continued.

Other more specific features, advantages and attributes of the novel holding device will become apparent in the course of the following detailed description of embodiments selected for illustration in the accompanying drawing, and the invention will be finally pointed out in the appended claims.

In the drawing,

Fig. 1 is a front elevational view of the article holder in idle position shown suspended from the ceiling;

Fig. 2 is a view of the article holder in side elevation, attached to a vertical wall and with a handle fully engaged by the retaining elements;

Fig. 3 is a top plan view of the holder shown in Fig. 1;

Figs. 4 and 5 illustrate two modifications of the retaining element;

Fig. 6 is a perspective view of the resilient sleeve which may be applied over the retaining elements of the article holder;

Fig. 7 is a front elevational view of a modified holder showing the open position of a retaining element and the ejector plate immediately before the handle is released; and Fig. 8 is a perspective view of a further modification.

Referring now in greater detail to the drawing, and first to Fig. 1, my holding device 10 is attached to the flanges 12a, 12b of a plate member 11 which, by means of bolts 14a, 14b, is connected to the lower end of an adapter plate 14. The latter has a horizontal flange 15 which is provided with suitable openings for the passage of bolts 16a, 16b connecting the entire assembly to the ceiling 17 of a store, storage room, cabinet or the like.

Pivotally connected to the flanges 12a, 12b of the plate member 11 are two U-shaped retaining members 18, 19 whose short legs 18a, 19a are received in tubular members 13a, 13b which, in the embodiment of Figs. 1 to 3, are integral with the flanges 12a, 12b, respectively. The long legs 18b, 19b of the respective retaining members 18, 19 are received in openings 22, 23 provided in connecting links 20, 21. Each of these links has an additional opening 24, 25 receiving the respective hook-shaped extremities 26a, 26b of a horizontal pivot pin 26. The latter is mounted for rotation in two bearing members 28a, 28b at the upper side of an ejector plate 27. Plate 27, whose portion adjacent its edge 27a is preferably slightly and upwardly curved as best shown in Fig. 2, is hinged by a pin 27b to the upwardly projecting extension 11a of plate member 11 between its flanges 12a, 12b. A coil spring 29 between long legs 18b, 19b exerts contracting force thereon and tends to move same into a position of horizontal alignment with the short legs 18a, 19a.

In Fig. 2, the plate member 11 is shown mounted directly on the side wall 30 by means of two or more bolts 30a.

The assembly of ejector plate 27, pin 26, links 20, 21 and U-members 18, 19 acts as a double toggle joint in mirror reverse. Thus, if the ejector plate 27 is swung upwardly about the hinge pin 27b (see the dot-dash position 27' of the ejector plate in Fig. 2), the hook members 26a, 26b entrain links 20, 21 whose lower ends move outwardly against the contracting force of spring 29 and entrain the long legs 18b, 19b of respective retaining members 18, 19 which thus release a handle 31 that has been frictionally held therebetween by the force of spring 29. With the above in view, and as best shown in Fig. 2, the operation of the article holder 10 is as follows:

To insert the handle 31 of a mop, broom, rake or the like, the handle is simply pushed in upward direction from its initial position 31" in the direction of arrow A between the long legs 18b, 19b of the two retaining members, until its upper end abuts against the plate 27. During such insertion of the handle, plate 27 is slightly pivoted in upward direction because the inserted handle causes long legs 18b, 19b to pivot about the respective short legs 18a, 19a until the distance between members 18b, 19b equals the diameter of handle 31. The user will immediately note that the article may be released when he feels that the upper end of handle 31 is in contact with plate 27. To assist the user in determining when the handle 31 is safely suspended, an annular groove 31a may be provided close to its upper end into which the long legs 18b, 19b of the respective retaining members 18, 19 descend by snap action, whereby an audible sound is produced indicating that the handle may be released. The spring 29, acting on long legs 18b, 19b, prevents the handle from falling out by gravity, especially when the groove 31a is provided therein.

To remove the handle from the holder 10, two methods may be employed:

In the first case, the handle is pushed upwardly and thus slides along the inclined lower surface of plate 27 into and past its position 31' indicated in dot-dash lines in Fig. 2. As the handle is pushed in upward direction, the inclination of plate 27 increases (see its dot-dash position 27') and thus the plate 27 actually ejects the handle by causing it to move in a direction toward left, i.e., toward and past the beveled free ends of members 18b, 19b. Spring 29 tends to maintain the short and long legs of U-members 18, 19 in a position of horizontal alignment and returns the same into such position when the handle 31 is removed. On insertion of the handle between the long legs 18b, 19b, the latter are pivoted about and lifted above the short legs 18a, 19a. Upon release of the handle, the frictional force between its peripheral portion and the contacting surfaces of long legs 18b, 19b, as well as the contracting force of spring 29 maintain the handle in suspended position. As will be understood, the tendency of handle 31 to drop by gravity actually contributes to the locking action which may be enhanced by providing one or more longitudinal grooves 32 in the contact surface of one or both long legs 18b, 19b, as is shown in the modified long leg 218b of U-member 218 which is illustrated in Fig. 5.

Of course, the handle 31 may be removed from between the long legs 18b, 19b without or only on minimal upward movement by rotating the handle about its vertical axis and pushing it in a direction toward the free ends of long legs 18b, 19b (see arrow B in Figs. 2 and 3). On the other hand, the handle 31 may be inserted by pushing it between the long legs 18b, 19b in the direction of arrow C (see Fig. 3), in which case no or minimal upward motion is required.

Fig. 4 shows a somewhat modified U-member 219 whose long leg 219b has a slightly knurled or otherwise roughened surface 219c so as to prevent sliding of handle 31 when the latter is rotated and moved in direction of arrow B or C for removal or insertion of the handle. The periphery of the other retaining member, of course, should preferably remain smooth. Opposing projections 33 (shown on long legs 219b and 218b in Figs. 4 and 5) are provided to facilitate proper positioning of link members 20, 21 and/or of the ends of spring 29 thereon.

The sleeve 34 of resilient material, shown in Fig. 6, may be slid over the long legs 18b, 19b to reduce the distance therebetween when a handle of unusually small diameter is suspended, and to increase the frictional force between the handle and the article holder 10.

All the handles need not be round since the holder 10 will operate in the same manner when a handle of polygonal, for example square or hexagonal, contour is suspended therein. A polygonal handle may be removed with least resistance if the method of removal shown in Fig. 2 is followed, i.e., by pushing such a handle in upward direction toward and along the ejector plate 27.

A further possible modification is shown in Fig. 7. Link 20 is omitted and the left-hand U-member 18 is rigidly connected with the flange 12a, for example by welding, without altering the mode of operation of the holder. The handle 31 will be engaged by a stationary long leg 18b and a yieldably mounted long leg 19b. In the position of Fig. 7, the handle is spaced from both the stationary leg 18b and from the movable leg 19b because the upwardly pushed ejector plate acts through pin 26, hook 26b and link member 21 on the retaining element 19 to withdraw its long leg from contact with the handle.

Fig. 8 illustrates a greatly simplified, low-cost construction of the article holder. Plate member 11 with its extension 11a and flanges 12a, 12b (see Figs. 1 to 3 and 7) is replaced by a metallic wire frame 111 which is fastened to a vertical wall 130 by means of two screws 130a. Frame 111 includes a horizontal member 111a pivotally supporting the rear end of ejector plate 127. The material of the frame is bent at both longitudinal ends of member 111a to define open slots for passage of screws 130a, and thereupon extends downwardly along wall 130 to be bent over itself in horizontal direction perpendicular to wall 130. Legs 113a, 113b defined by frame 111 pivotally support respective retaining elements 118, 119 of U-shape whose bases 118a, 119a are connected by means of a coil spring 129 and pivotally support suitably shaped lower ends 122, 123 of respective connecting links 120, 121. The upper ends 124, 125 of said links are pivotally connected with the longitudinal ends of a horizontal rod 126 supported in bearings 128a, 128b at the underside of ejector plate 127. The portion of ejector plate 127 adjacent its horizontal edge 127a is upwardly curved as in the previously described embodiments. A handle 31, whose upper end is broken away for better illustration of the holder 110, is inserted in the latter by moving it in upward direction between the bases 118a, 119a of respective U-members 118, 119 until it abuts against the lower surface of ejector plate 127, as is shown in dot-dash lines. The retaining and ejecting actions of the device are analogous to those described above in connection with other embodiments. This form of article holder is very light and may be made at substantial savings in material. While not as rigid as that shown in Figs. 1 to 3 and 7, it can securely support a handle without deformation.

Various other changes and modifications will occur to persons skilled in the art without departing from the spirit of my invention, and I therefore do not desire to be limited to the exact details of my disclosure but only by the scope of the appended claims.

What I claim and desire to protect by Letters Patent is:

1. In an article holder of the character described, in combination: a pair of retaining means each comprising a substantially horizontal member; first supporting means pivotally mounting at least one of said retaining means for rotation about a horizontal axis spaced from the respective member; an ejector plate above and spaced from said members; second supporting means pivotally mounting said plate for movements about a horizontal axis substantially at right angles to said first named axis; resilient means operatively connected with both said retaining means for urging said members toward each other; and means articulately connecting the member of each pivotally supported retaining means with said ejector plate whereby, when the latter is swung in upward direction away from said members, each member connected with said plate is swung about the respective first named axis upwardly, away from the other member, and against the force of said resilient means.

2. The combination according to claim 1, further comprising a stationary supporting plate which is substantially vertical when said holder is in operative position, said first and said second supporting means being rigidly connected with said supporting plate.

3. The combination according to claim 1, further comprising a wire frame, said first supporting means consisting of at least one horizontal rod forming part of said frame and parallel with and spaced from the respective member, and said second supporting means being a horizontal rod forming part of said frame and disposed substantially at right angles to each said first named rod.

4. The combination according to claim 1, wherein said retaining means are of U-shape each having a first leg and a second leg, the first legs being horizontally aligned and the second legs constituting said horizontal members, at least one of said second legs being swingable about the respective first leg.

5. The combination according to claim 1, wherein said means articulately connecting the member of each pivotally supported retaining means with said plate comprises a link having one end swingably connected with the respective member and another end; and a shaft rotatably attached to said plate and swingably connected with the last mentioned end of each link.

6. The combination according to claim 1, wherein at least a portion of said plate is upwardly curved in a direction transverse to said last named axis.

7. In an article holder of the character described, in combination: a supporting plate which is substantially vertical when the holder is in operative position and having a pair of spaced horizontally aligned flanges and a median portion extending above said flanges; a pair of U-shaped retaining elements each having a first leg swingably connected to one of said flanges and a horizontal second leg swingable about the respective first leg and disposed substantially at right angles to the plane of said plate; a resilient element connected to said second legs for urging same into a position of horizontal alinement with and between said first legs; an ejector plate having a horizontal edge swingably connected with the median portion of said supporting plate above said second legs and at least partially upwardly curved in a direction at right angles to said supporting plate; and a pair of links each swingably connected with one of said second legs and with said ejector plate, respectively, whereby the ejector plate is swung upwardly about said horizontal edge when said second legs are pivoted in upward direction about the respective first legs, away from each other, and against the force of said resilient element.

8. In an article holder of the character described, in combination: a supporting wire frame comprising a horizontal portion and a pair of horizontal legs disposed at right angles to said portion; a pair of U-shaped retaining means each having a base and a pair of free extremities, each pair of said extremities being pivotally connected with one of said legs; resilient means connected with said bases for permanently urging same into a position of horizontal alinement with and between said legs; an ejector plate above and spaced from said bases and having an edge swingably connected with said portion; and a pair of links each swingably connected with one of said bases and with said plate, respectively, whereby the plate is pivoted in upward direction about said edge when the bases are swung upwardly about said legs, away from each other, and against the force of said resilient means.

References Cited in the file of this patent

UNITED STATES PATENTS

| 475,569 | Johnson | May 24, 1892 |
| 692,905 | Rehrig | Feb. 11, 1902 |
| 1,554,481 | Andreck | Sept. 22, 1925 |